(12) United States Patent
Hendey et al.

(10) Patent No.: US 10,137,954 B2
(45) Date of Patent: Nov. 27, 2018

(54) INTEGRATED ELECTRIC BICYCLE DRIVE SYSTEM

(71) Applicant: SPIR BIKES, LLC, Indianapolis, IN (US)

(72) Inventors: Matthew Hendey, Indianapolis, IN (US); Stephen Moore, Fishers, IN (US); John Waters, Fishers, IN (US)

( * ) Notice: Subject to any disclaimer, the term of this patent is extended or adjusted under 35 U.S.C. 154(b) by 47 days.

(21) Appl. No.: 15/098,502

(22) Filed: Apr. 14, 2016

(65) Prior Publication Data

US 2016/0303961 A1    Oct. 20, 2016

Related U.S. Application Data

(60) Provisional application No. 62/147,356, filed on Apr. 14, 2015.

(51) Int. Cl.

| | |
|---|---|
| *B62J 1/08* | (2006.01) |
| *B62M 6/55* | (2010.01) |
| *B62M 6/90* | (2010.01) |
| *B62K 19/30* | (2006.01) |
| *B60K 1/04* | (2006.01) |

(52) U.S. Cl.
CPC .............. *B62J 1/08* (2013.01); *B62K 19/30* (2013.01); *B62M 6/55* (2013.01); *B62M 6/90* (2013.01); *B60K 2001/0494* (2013.01); *B60Y 2200/13* (2013.01)

(58) Field of Classification Search
CPC . B62J 1/08; B62K 19/30; B62M 6/55; B62M 6/90; B60K 2001/0494; B60Y 2200/13
See application file for complete search history.

(56) References Cited

U.S. PATENT DOCUMENTS

| 8,651,212 | B2 * | 2/2014 | Vincenz | B62H 5/001 |
| | | | | 180/205.1 |
| 8,906,528 | B2 * | 12/2014 | Fujii | B62J 1/08 |
| | | | | 429/100 |
| 9,227,695 | B2 * | 1/2016 | Liu | B62M 6/55 |
| 9,676,443 | B2 * | 6/2017 | Perkins | B62M 6/90 |

(Continued)

FOREIGN PATENT DOCUMENTS

EP    2 423 096 A2    2/2012

*Primary Examiner* — Paul N Dickson
*Assistant Examiner* — Marlon A Arce
(74) *Attorney, Agent, or Firm* — Roberts IP Law; John Roberts

(57) ABSTRACT

An integrated high-performance and light-weight electric drive system for a bicycle is disclosed comprising an integrated unitary motor-controller-drive system that can be inserted into and removed from a first tube portion of a bicycle frame through an open bottom bracket shell portion of the bicycle frame. A longitudinally-extending battery pack configured to be electrically connected with and to provide electrical power to the electric motor and the controller may be configured to be inserted into and removed from a second tube portion of the bicycle frame through the open bottom bracket shell portion of the bicycle frame. Some or all of the electrical components may not be visible from the exterior of the bicycle. A unique digital torque sensing and control system is described along with regenerative braking and other unique features.

24 Claims, 14 Drawing Sheets

(56) References Cited

U.S. PATENT DOCUMENTS

| | | | |
|---|---|---|---|
| 2006/0208450 A1* | 9/2006 | Rizzetto | B62M 6/55 |
| | | | 280/210 |
| 2013/0001000 A1 | 1/2013 | Krieger et al. | |
| 2014/0196970 A1* | 7/2014 | Biechele | B62J 99/00 |
| | | | 180/206.4 |
| 2015/0011346 A1* | 1/2015 | MacMartin | B62M 6/55 |
| | | | 475/4 |
| 2016/0016625 A1* | 1/2016 | Williams | B62M 6/55 |
| | | | 280/287 |
| 2017/0073040 A1* | 3/2017 | Djakovic | B62M 6/45 |
| 2017/0073042 A1* | 3/2017 | Evensen | B62M 6/90 |
| 2017/0183057 A1* | 6/2017 | Gibbings | B62M 3/003 |
| 2017/0183061 A1* | 6/2017 | Yamamoto | B62M 11/145 |

\* cited by examiner

INTEGRATED ELECTRIC BICYCLE DRIVE SYSTEM

CROSS-REFERENCE TO RELATED APPLICATIONS

The present application claims priority to, incorporates herein by reference, and is a non-provisional of U.S. provisional patent application Ser. No. 62/147,356 filed Apr. 14, 2015 and entitled Bicycle-Related Apparatus, Systems, and Methods (herein, "the '356 Application").

FEDERALLY SPONSORED RESEARCH OR DEVELOPMENT

None.

TECHNICAL FIELD

The present invention relates generally to bicycle-related apparatus, systems, and methods, and more particularly to electrically-powered bicycles, including in certain example embodiments integrated electric drive systems for bicycles.

BACKGROUND

Bicycles powered in part or entirely by electric motors are known, but they typically locate some or all of the heavy batteries and drive train components outside the frame of the bicycle, and often toward the rear of the bicycle, or an upper part of the bicycle, or both. This weighs down the backend of the bike, raises the center of gravity, or both, resulting in sluggish speed, poor handling, and erratic balance. Further, mounting the batteries and various drive components outside the frame of the bicycle results in a non-integrated, add-on appearance that also exposes these expensive and delicate parts to damage or theft. Efforts have been made to integrate electric bicycle components with bicycle frames, but the result has typically been an awkward, heavy, and bulky-looking structure that more resembles a moped or scooter rather than the minimalist, thin, tubular frames of normal bicycles.

SUMMARY

The present invention(s) elegantly overcome many of the drawbacks of prior systems and provide numerous additional improvements and benefits as will be apparent to persons of skill in the art. Provided in various example embodiments is a high-performance, light-weight, integrated electric drive system configured to fit low and centrally within the relatively thin, tubular frame structure typical of conventional non-electric bicycles. In various example embodiments the drive system automatically applies power based on the amount of force a rider applies to the pedals, negating the need for a separate throttle or external controls. As such, in various example embodiments it would often not be evident to someone looking at the bicycle that it includes electric power. In various example embodiments the integrated electric drive system comprises an integrated unitary motor-controller-drive system that can be inserted into and removed from a first tube portion of a bicycle frame through an open bottom bracket shell portion of the bicycle frame. Also provided in various example embodiments is a longitudinally-extending battery pack configured to be electrically connected with and to provide electrical power to the electric motor and the controller, the longitudinally-extending battery pack configured to be inserted into and removed from a second tube portion of the bicycle frame through the open bottom bracket shell portion of the bicycle frame.

Accordingly, provided herein in various example embodiments is an integrated electric bicycle drive system comprising an integrated unitary motor-controller-drive system for a bicycle having a frame, the integrated unitary motor-controller-drive system for a bicycle having a frame comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket configured to be mechanically coupled with a rear wheel of the bicycle and to receive additional power from a rider of the bicycle pedaling the bicycle; wherein the electric motor and the controller portions of the integrated unitary motor-controller-drive system are configured to slide into and be housed within a first tube portion of the frame through an open bottom portion of the frame, the drive system portion of the integrated unitary motor-controller-drive system configured to attach with and cover the open bottom portion of the frame when the electric motor and the controller portions of the integrated unitary motor-controller-drive system are housed within the first tube portion of the frame.

In various example embodiments the first tube portion of the frame comprises a seat post tube configured to partially receive therein a post to support a seat for the bicycle. In various example embodiments the first tube portion of the frame comprises a front down tube that extends from a head tube of the frame to a bottom bracket shell of the frame. In various example embodiments the integrated electric bicycle drive system further comprises a longitudinally-extending battery pack configured to be electrically connected with and to provide electrical power to the electric motor and the controller, the longitudinally-extending battery pack configured to slide into and be housed within a second tube portion of the frame. In various example embodiments the second tube portion of the frame comprises a front down tube that extends from a head tube of the frame to a bottom bracket shell of the frame. In various example embodiments the second tube portion of the frame comprises a seat post tube configured to partially receive therein a post to support a seat for the bicycle. In various example embodiments the longitudinally-extending battery pack has an electrical energy capacity of at least 800 Watt-hours. In various example embodiments the motor is capable of producing at least 750 Watts of power. In various example embodiments the motor is capable of producing at least 100 Newton-meters of torque. In various example embodiments the unitary motor-controller-drive system and the longitudinally-extending battery pack together weigh 16 pounds or less.

Also provided in various example embodiments is a bicycle having a frame, the bicycle comprising an integrated unitary motor-controller-drive system comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket mechanically coupled with a rear wheel of the bicycle and configured to receive additional power from a rider of the bicycle pedaling the bicycle; wherein the electric motor and the controller portions of the integrated unitary motor-controller-drive system are housed within a first tube portion of the frame, and the drive system portion of the integrated unitary motor-controller-drive system is removably attached to an open bottom portion of the frame, the integrated unitary motor-controller-drive system configured to be removable from the frame and replaceable in the frame in one piece.

In various example embodiments the first tube portion of the frame comprises a seat post tube configured to partially receive therein a post to support a seat for the bicycle. In various example embodiments the first tube portion of the frame comprises a front down tube that extends from a head tube of the frame to a bottom bracket shell portion of the frame. In various example embodiments the bicycle further comprises a longitudinally-extending battery pack electrically connected with and configured to provide electrical power to the electric motor and the controller, the longitudinally-extending battery pack removably housed within a second tube portion of the frame. In various example embodiments the second tube portion of the frame comprises a front down tube that extends from a head tube of the frame to a bottom bracket shell of the frame. In various example embodiments the second tube portion of the frame comprises a seat post tube configured to partially receive therein a post to support a seat for the bicycle. In various example embodiments the longitudinally-extending battery pack is configured to be removable from the frame by removing the integrated unitary motor-controller-drive system from the frame and sliding the longitudinally-extending battery pack out of the second tube portion of the frame, through the open bottom portion of the frame. In various example embodiments the integrated unitary motor-controller-drive system is configured to be removable from the frame by detaching the integrated unitary motor-controller-drive system from the open bottom portion of the frame, and sliding the electric motor and the controller portions of the integrated unitary motor-controller-drive system out of the first tube portion of the frame, through the open bottom portion of the frame. In various example embodiments the longitudinally-extending battery pack is configured to be removable from the frame by removing the integrated unitary motor-controller-drive system from the frame and sliding the longitudinally-extending battery pack out of the second tube portion of the frame, through the open bottom portion of the frame. In various example embodiments the electric motor and the controller portions of the integrated unitary motor-controller-drive system extend along a longitudinal axis and have cross-sectional areas perpendicular to their longitudinal axis, and the cross-sectional areas are no larger than 4.9 square inches. In various example embodiments the longitudinally-extending battery pack extends along a longitudinal axis and has a cross-sectional area perpendicular to its longitudinal axis, and the cross-sectional area is no larger than 24.9 square inches. In various example embodiments the first tube portion of the frame is hollow and has an interior that extends along a longitudinal axis and that has a cross-sectional area perpendicular to its longitudinal axis, and the cross-sectional area is no larger than 5 square inches. In various example embodiments the second tube portion of the frame is hollow and has an interior that extends along a longitudinal axis and that has a cross-sectional area perpendicular to its longitudinal axis, and the cross-sectional area is no larger than 25 square inches. In various example embodiments the open bottom portion of the frame comprises a bottom bracket shell with an open bottom portion.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure. It will be understood that certain components and details may not appear in the Figure(s) to assist in more clearly describing the invention.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying Figure(s). While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
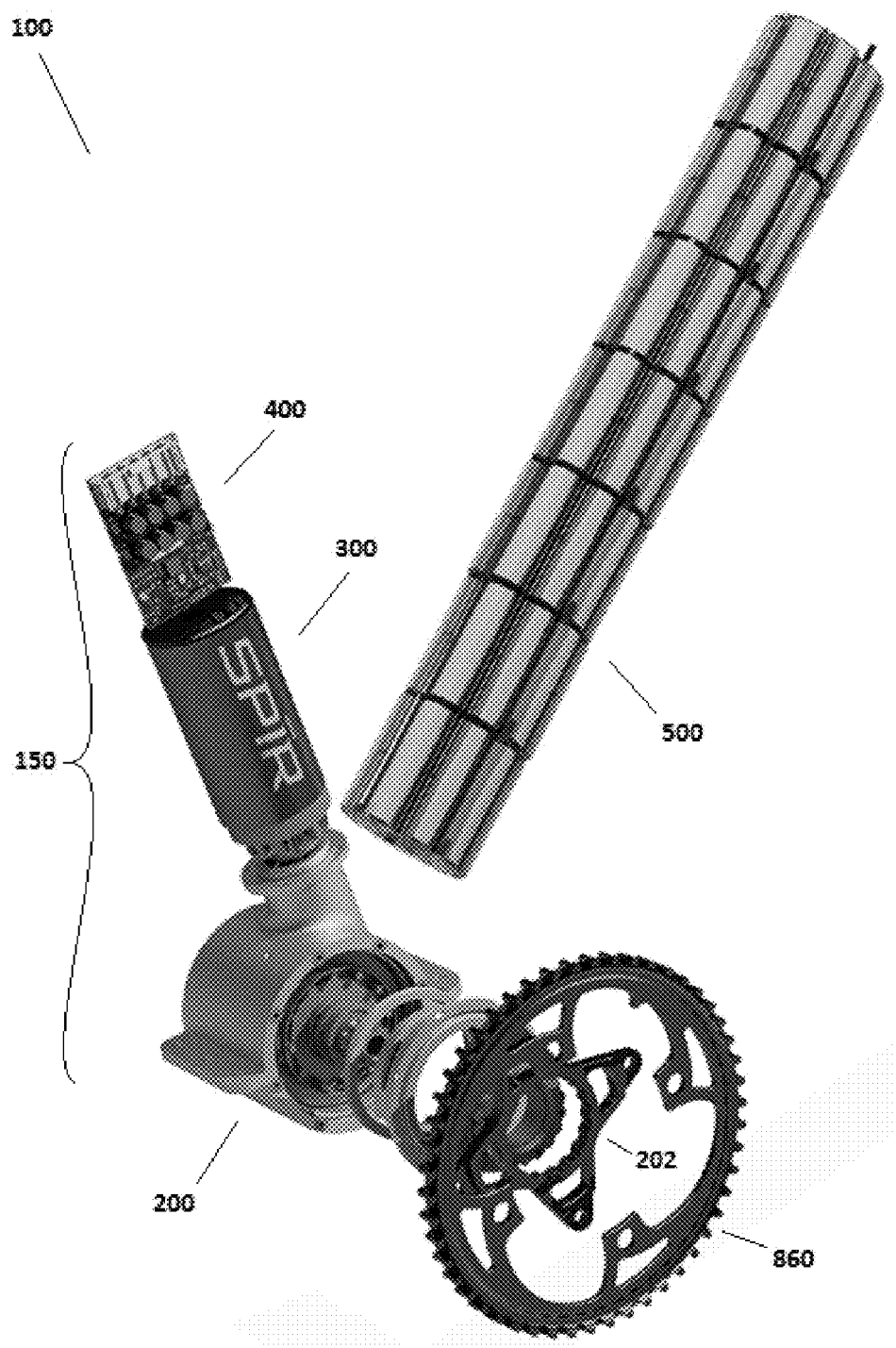
FIG. 1 is a perspective illustration of example components of an integrated electric bicycle drive system according to various example embodiments.

Turning to FIG. 1, shown is a perspective illustration of example components of an integrated electric bicycle drive system 100 according to various example embodiments, including an example drive system 200, electric motor 300, controller 400, and longitudinally-extending battery pack 500. The drive system 200, electric motor 300, and motor controller 400 are mechanically connected, and together constitute an integrated unitary motor-controller-drive system 150. Also shown in FIG. 1 is an output spider 202 that is driven by the drive system 200, and which connects with and drives a sprocket 860. Some or all of these components may be provided together as a kit to add electric power to bicycles having frames with hollow portions.

Figure 2:
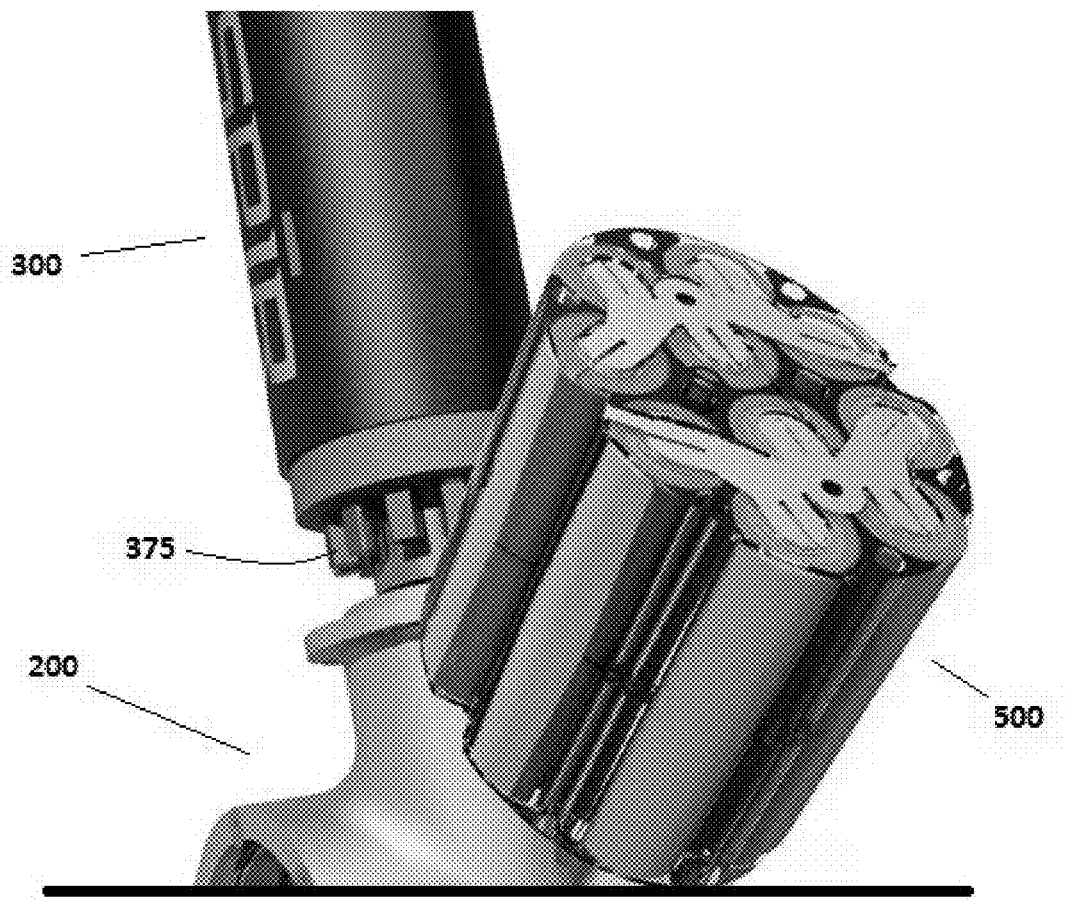
FIG. 2 is a closer view of the example components of FIG. 1, showing an example longitudinally-extending battery pack partially cut-away.

FIG. 2 is a closer view of the example components of FIG. 1, showing an example motor mount 375. Alternatively or additionally, a self-aligning, vibration-isolating motor mount like that described in the '356 Application may be used.

Figure 3:
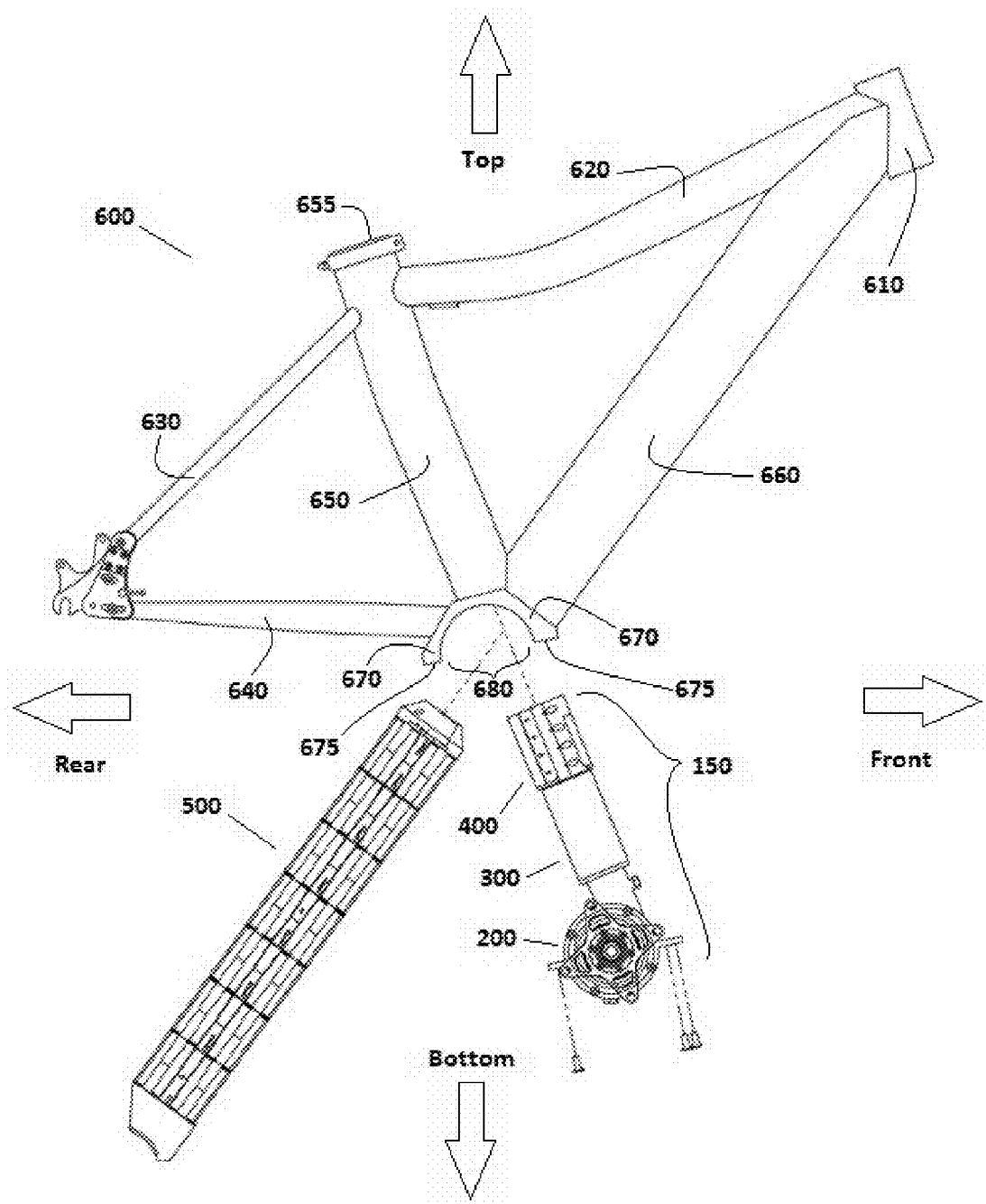
FIG. 3 is an exploded right side elevation view of example components of an integrated electric bicycle drive system, illustrating the removal or replacement of an example integrated unitary motor-controller-drive system and an example longitudinally-extending battery pack through an open bottom portion of a bottom bracket shell of an example bicycle frame according to various example embodiments.

FIG. 3 is an exploded right side elevation view of example components of an integrated electric bicycle drive system 100, illustrating the removal or replacement of an example integrated unitary motor-controller-drive system 150 and an example longitudinally-extending battery pack 500 through an open bottom portion 680 of a bottom bracket shell 670 of an example bicycle frame 600 according to various example embodiments. The example frame 600 may be constructed entirely or in part from hollow tubes of any suitable material, such as aluminum, steel, carbon fiber or other composite material, and in FIGS. 3 and 4 comprises a head tube 610, top tube 620, right seat stay 635, left seat stay 635, right chain stay 640, left chain stay 645, seat tube 650, hollow interior 651 of seat tube 650, seat tube top 655, down tube 660, hollow interior 661 of down tube 660, bottom bracket shell 670, and drive system mounting surfaces 675 on the bottom of the bottom bracket shell 670 and on either side of the open bottom portion 680 of the frame 600. Any or all of the tubes comprising the frame 600 may have any suitable cross-sectional shapes, such as round or oval, for example.

Figure 4:
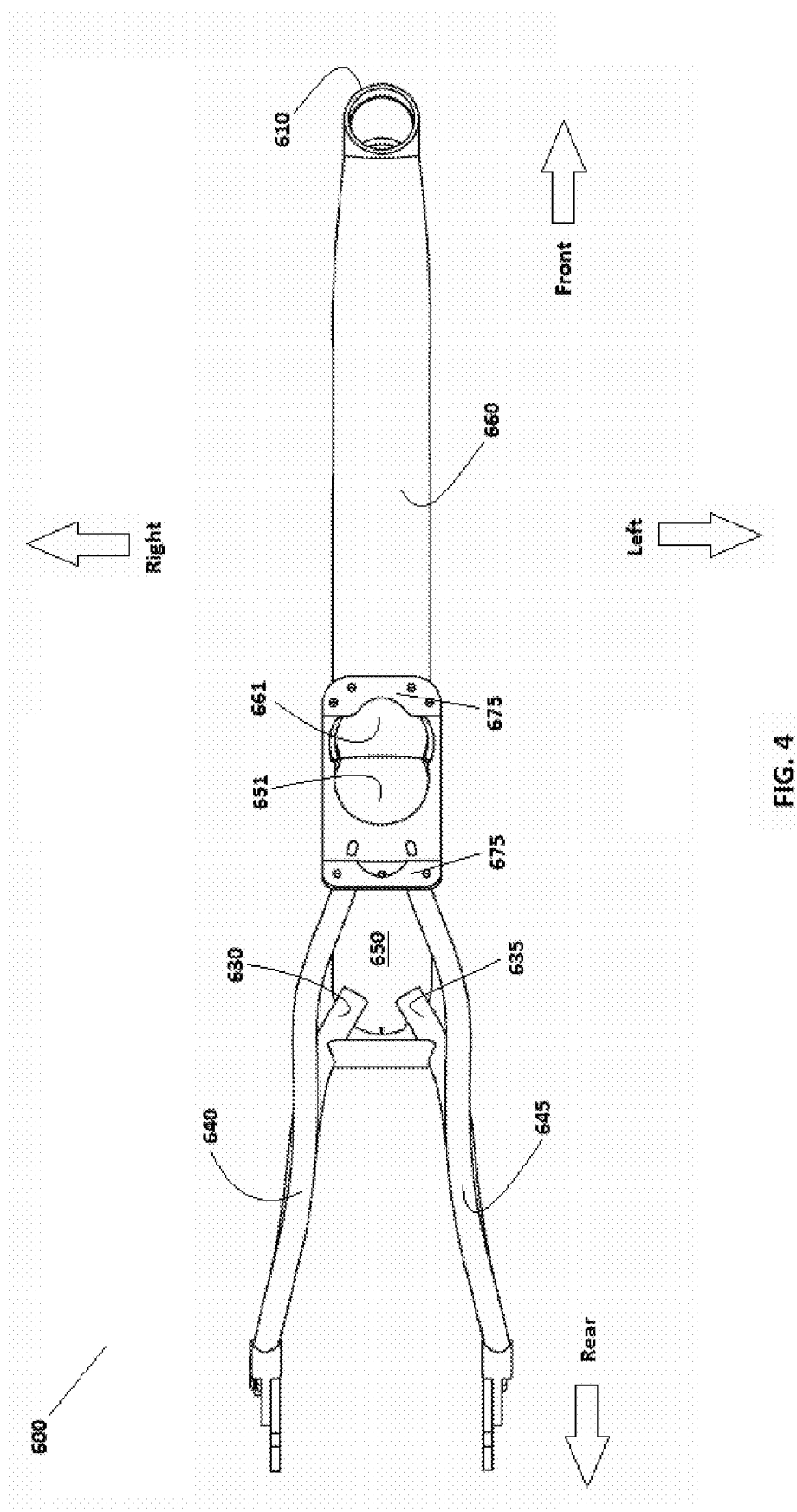
FIG. 4 is a bottom plan view of the example bicycle frame of FIG. 3, showing the open bottom portion of the bottom bracket shell according to various example embodiments.

FIG. 4 is a bottom plan view of the example bicycle frame 600 of FIG. 3, better showing the drive system mounting surfaces 675 on the bottom of the bottom bracket shell 670 and on either side of the open bottom portion 680 of the frame 600 according to various example embodiments. Since the bottom of the bottom bracket shell 670 is open, access is provided there-through to the hollow interior 651 of seat tube 650 and to the hollow interior 661 of the down tube 660.

Figure 5:
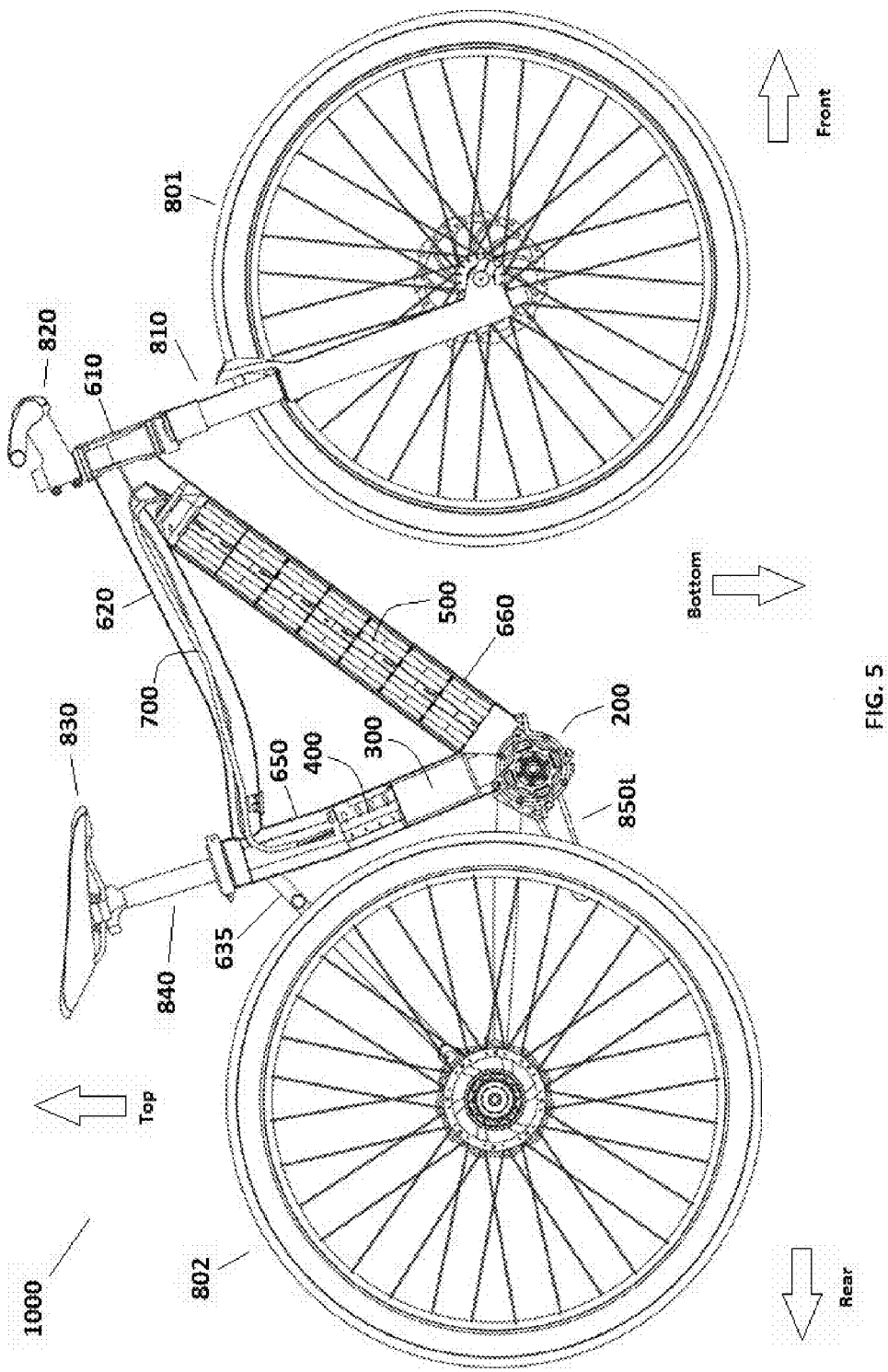
FIG. 5 is a right side elevation view of an example bicycle having an electric bicycle drive system integrated into the frame according to various example embodiments, with portions of the frame cut-away to illustrate various example components located within the frame.

FIG. 5 is a right side elevation view of an example bicycle 1000 having an electric bicycle drive system 100 integrated into the frame 600 according to various example embodiments, with portions of the frame 600 cut-away to illustrate various example components located within the frame 600. The longitudinally-extending battery pack 500 has been inserted through the open bottom portion 680 of the frame 600 into the hollow interior 661 of the down tube 660, then the integrated unitary motor-controller-drive system 150 has been inserted through the open bottom portion 680 of the frame 600 into the hollow interior 651 of seat tube 650. The integrated unitary motor-controller-drive system 150 is in electrical communication with the longitudinally-extending battery pack 500 by wiring 700 passing through the interior of top tube 620 and connecting them to provide power from the batteries 500 to the motor controller 400 and the electric motor 300. The integrated unitary motor-controller-drive system 150 may be attached with the frame 600 with fasteners (not shown) passing through the frame mounting surfaces 212 (FIG. 7) of the drive system 200 and into the drive system mounting surfaces 675 on the bottom of the bottom bracket shell 670 of the frame 600, such that the drive system housing 210, 216 (FIG. 9) covers the open bottom portion 680 of the frame 600.

In various example embodiments, the motor 300 may be cylindrically shaped and smaller in cross-sectional diameter than the inside diameter of the hollow interior 651 of the seat tube 650. A motor mount may be provided as described in more detail in the '356 Application, which is incorporated herein by reference, that features an inner sleeve with an inside diameter that fits the cylindrical motor 300. Such an inner sleeve may be radially coupled to an outer sleeve using metallic or heat-conductive fins. The outer sleeve outside diameter may fit into the seat tube 650. The voids between each heat-conductive fin may be filled with an acoustic-damping material. The heat from the motor 300 may be first conducted to the inner sleeve, then to the heat fins, then to the outer sleeve, and finally to the seat tube 650. To prevent the motor 300 from spinning within the inner sleeve, a pin or fastener can hold the motor 300 in place. To prevent the entire motor assembly from spinning within the seat tube 650, a faster or pin can be used, or the tube 650 can be non-circular.

While in the example embodiments shown the motor 300 and controller 400 of the integrated unitary motor-controller-drive system 150 are located in the seat tube 650, in alternative embodiments those components can be located in a different tube, such as down tube 660, and the batteries 500 can be located in the seat tube 650 or some other part(s) of the frame 600.

Figure 6:
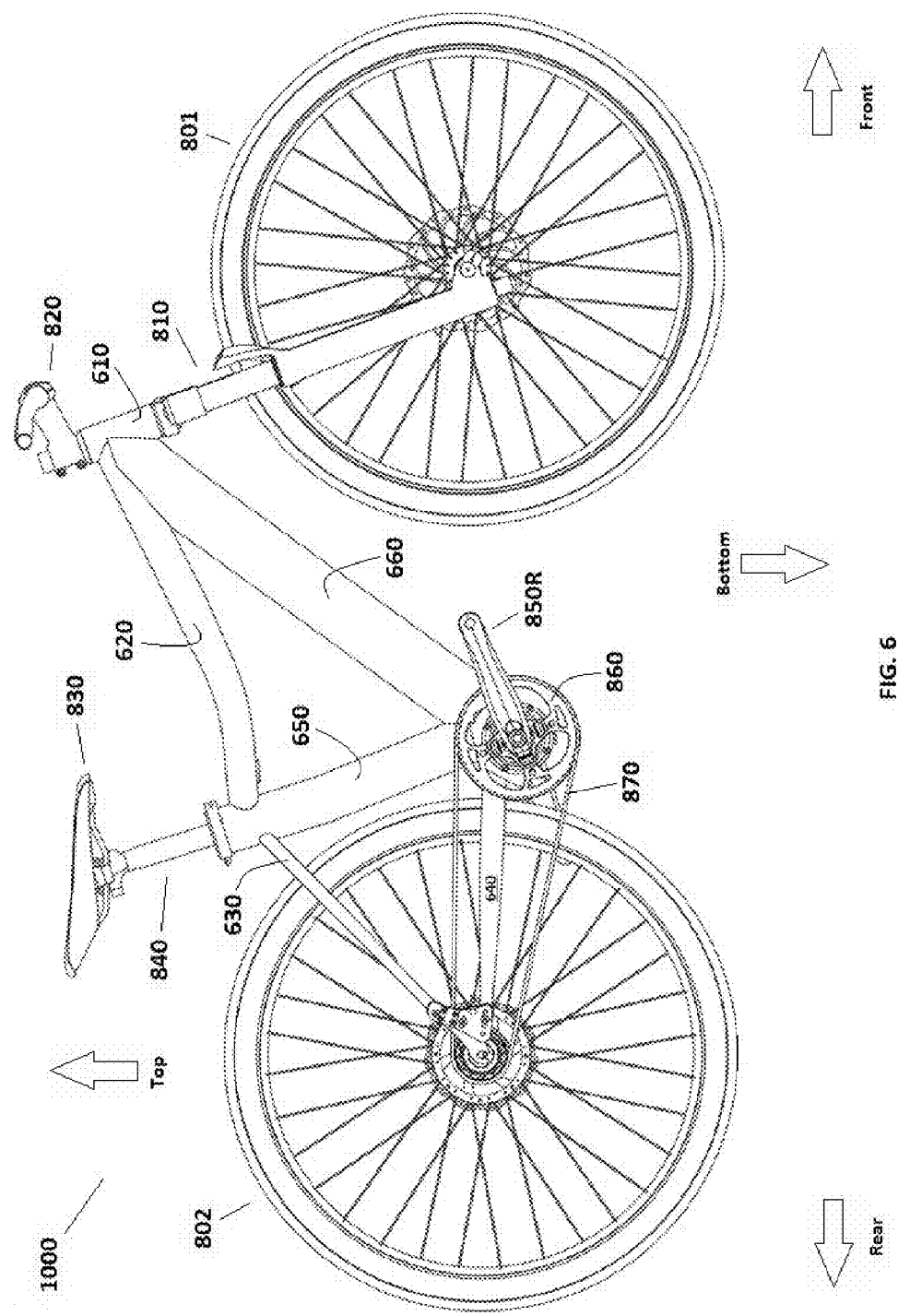
FIG. 6 is a right side elevation view of the example bicycle of FIG. 5, shown complete with the frame intact (except pedals not shown).

Other example components of bicycle 1000 shown in FIGS. 5 and 6 include a front wheel 801, rear wheel 802, front forks 810, handlebars 820, seat 830, seat post 840 extending into the interior 651 of seat post tube 650, left crankshaft 850L, right crankshaft 850R, drive sprocket 860, and a chain or belt 870 driveably connecting drive sprocket 860 with the rear wheel 802. Pedals are not shown mounted near the outer ends of left crankshaft 850L and right crankshaft 850R, but it is understood that in use pedals are located thereon for a rider to apply force against with the rider's feet to pedal the bicycle.

FIG. 6 is a right side elevation view of the example bicycle 1000 of FIG. 5, shown complete with the frame 600 intact. As evident from FIG. 6, in various example embodiments there may be little or no indication from the outside of the bicycle 1000 that it contains therein an electric motor 300, controller, 400, complex drive system 200, and large battery pack 500. Rather, in various example embodiments bicycle 1000 may be constructed to appear like a conventional bicycle having a robust but typical tube frame. This may be true even where high-performance components are used. For example, in various example embodiments the longitudinally-extending battery pack 500 may have an electrical energy capacity of at least 500, 600, 700, or even 800 or more Watt-hours. In various example embodiments the motor 300 may be capable of producing at least 450, 550, 650, or even 750 or more Watts of power, and at least 70, 80, 90 or even 100 or more Newton-meters of torque. Notwithstanding these high energy, power, and torque ratings, an integrated electric bicycle drive system 100 meeting the highest of all of those specifications, including the unitary system 150 and battery pack 500, have been developed that together weigh a total of 16 pounds or less. And this weight is located low and centrally in the bicycle 1000, facilitating good handling and balance.

With further reference to FIG. 6, a bicycle 1000 with a frame 600 incorporating an integrated electric bicycle drive system 100 meeting the highest of all the energy, power, and torque specifications listed in the immediately preceding paragraph can be packaged in frame tubes that are not overly bulky in size. For example, an integrated electric bicycle drive system 100 meeting the highest of all the energy, power, and torque specifications listed in the immediately preceding paragraph can have an electric motor 300 and controller 400 that both have cross-sectional areas less than 4.9 square inches, and a longitudinally extending battery pack 500 with a cross-sectional area of 24.9 square inches or less (each measured in a plane perpendicular to its longitudinal axis). Accordingly, provided in various example embodiments is a bicycle 1000 with a frame 600 having integrated therein an electric bicycle drive system 100 meeting the highest of all the energy, power, and torque specifications listed in the immediately preceding paragraph, wherein the interior 651 of the seat tube 650 has a cross-sectional areas no more than 5 square inches, and the interior 661 of the downtube 660 has a cross-sectional areas no more than 25 square inches (each measured in a plane perpendicular to its longitudinal axis).

Figure 7:
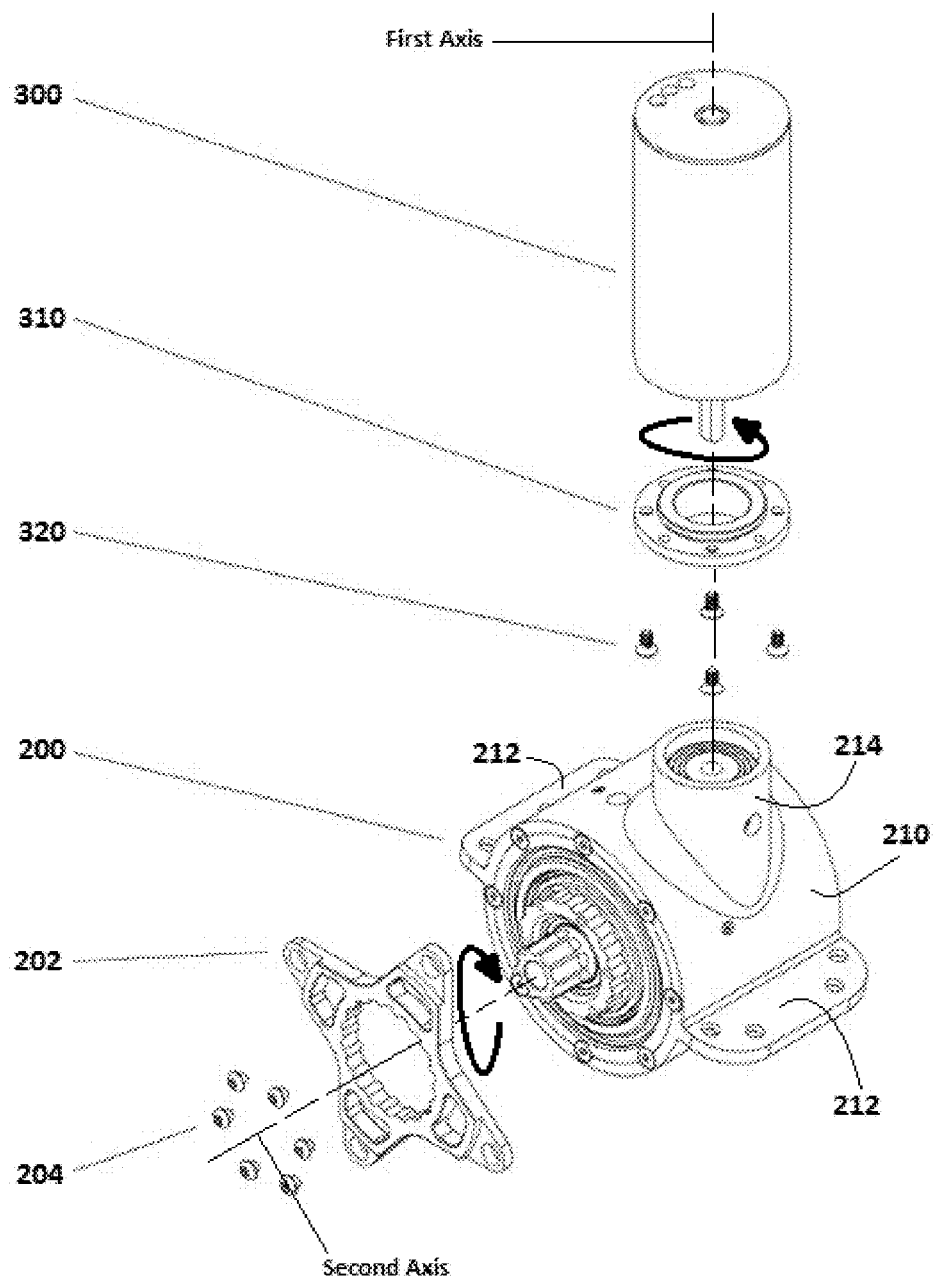
FIGS. 7, 8, and 9 are partially exploded perspective views of example components of an integrated unitary motor-controller-drive system according to various example embodiments.
Figure 8:
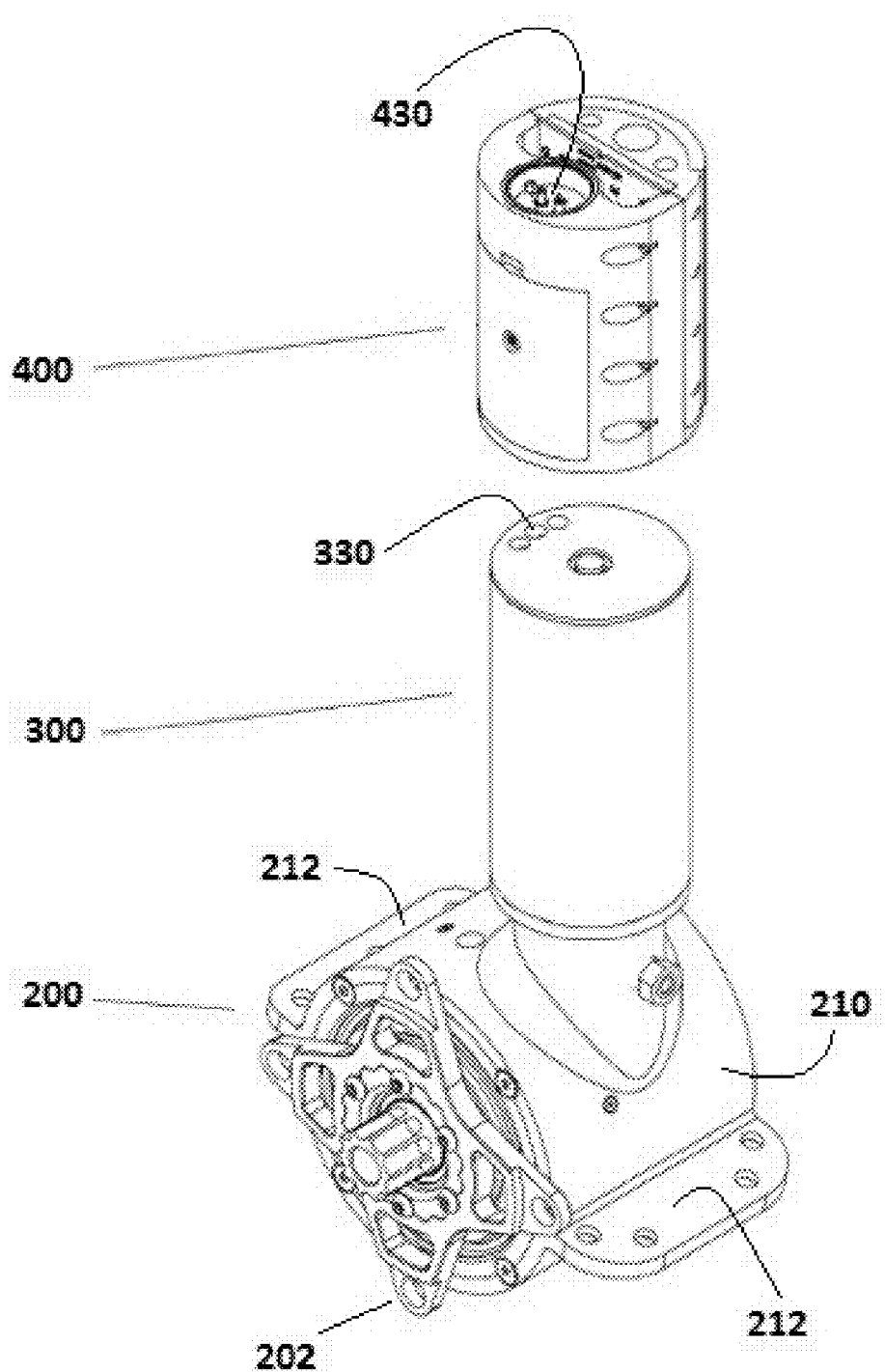
Figure 9:
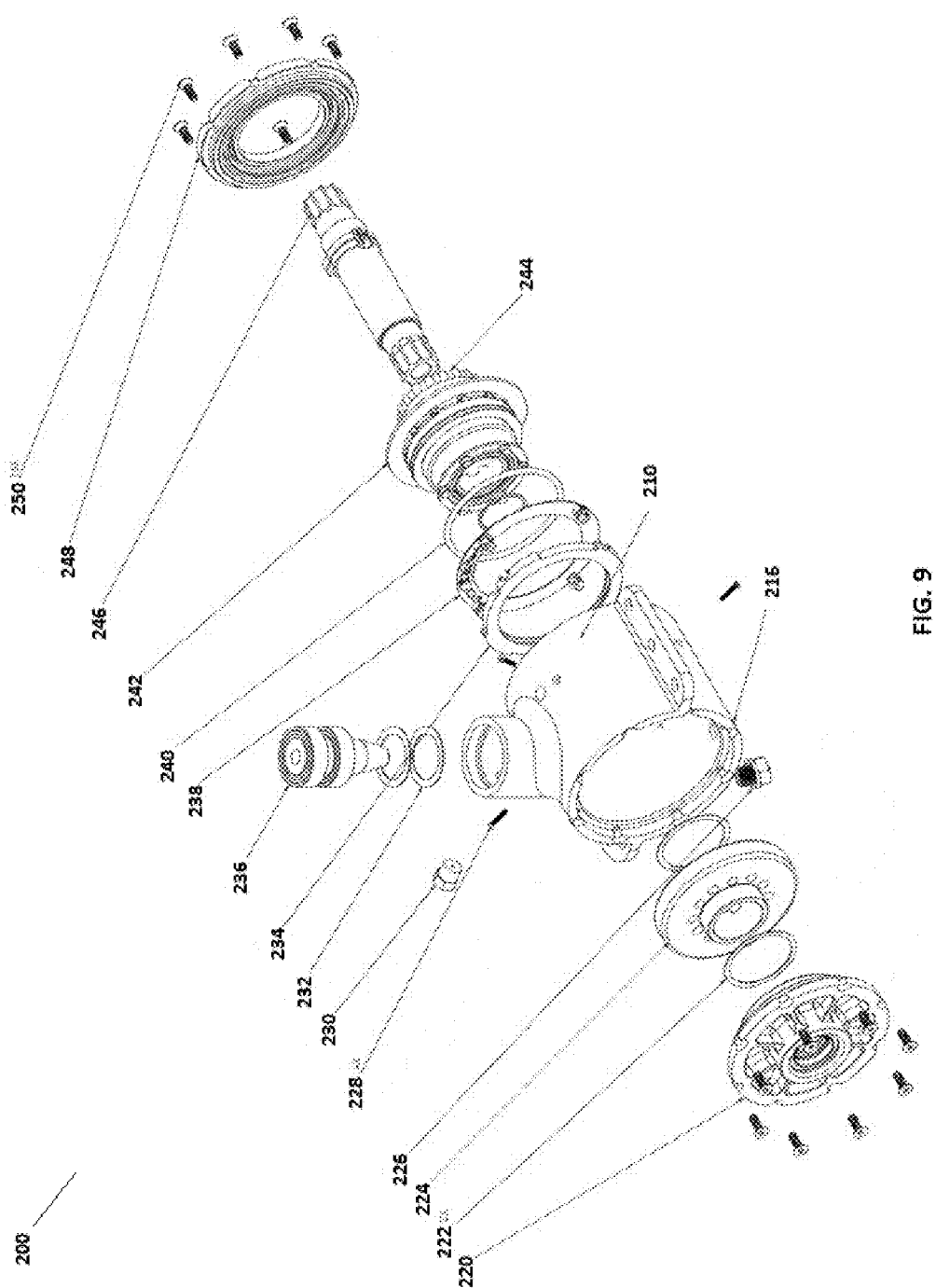

FIGS. 7, 8, and 9 are partially exploded perspective views of example components of an integrated unitary motor-controller-drive system 150 according to various example embodiments. FIG. 7 depicts an example drive system 200 having a housing 210 with a motor mounting tower 214 constructed to be mechanically coupled with an electric motor 300 via a motor-to-housing adapter 310 and fasteners 320, where the drive system 200 is configured to receive from the electric motor 300 rotational power about a first axis (depicted in FIG. 7) and to transmit said rotational power to an output spider 202 rotatable about a second axis perpendicular to the first axis, as depicted in FIG. 7. Output spider 202 may be connected to the rest of the drive system 200 by fasteners 204, and one or more sprockets 860 (FIGS. 1, 6) may be attached to and driven in part by the output spider 202 by fasteners (not shown). Frame mounting surfaces 212 are shown on housing 210 for mounting the integrated unitary motor-controller-drive system 150 to the drive system mounting surfaces 675 on the bottom of the bottom bracket shell 670 of the frame 600.

FIG. 8 depicts an example controller 400 constructed to be mechanically connected with and in electrical communication with motor 300 via a receptacle 330 for plugging-in controller 400. Example controller 400 includes a receptacle 430 for plugging-in wiring 700 (FIG. 5). To facilitate easy assembly and removal of the various components from the frame 600, receptacle 430 and a similar receptacle (not shown) on the forward or front end of battery pack 500 may each comprise a Rosenberger-type self-locating magnetic connector (of the type available from Rosenberger Hochfrequenztechnik GmbH & Co. KG of Fridolfing, Germany) which can be connected without human access. Such connectors draw the mating ends of the connecting wiring 700 toward the receptacles 430 and make an electrical connection by magnetic attraction. Installation of components 150, 500 in a frame 600 can be accomplished in various example embodiments by fishing wiring 700 through the tubes in the frame 600 to the position shown in FIG. 5, inserting the battery pack 500 into the frame 600 and magnetically connecting a front end of wiring 700 to the front end of the battery pack 500, then inserting the unitary drive system 150 into the frame 600 and magnetically connecting the controller 400 to a rear end of wiring 700. The components 150, 500 can then be removed in reverse order by simply pulling the connection between receptacles 430 and wiring 700 apart without the need to access the connection. Electronics and programming for controllers for motors for electrically-powered bicycles are known, and further detail regarding those matters is not provided herein aside from the example information disclosed in the '356 Application, which is incorporated herein by reference.

Figure 10:
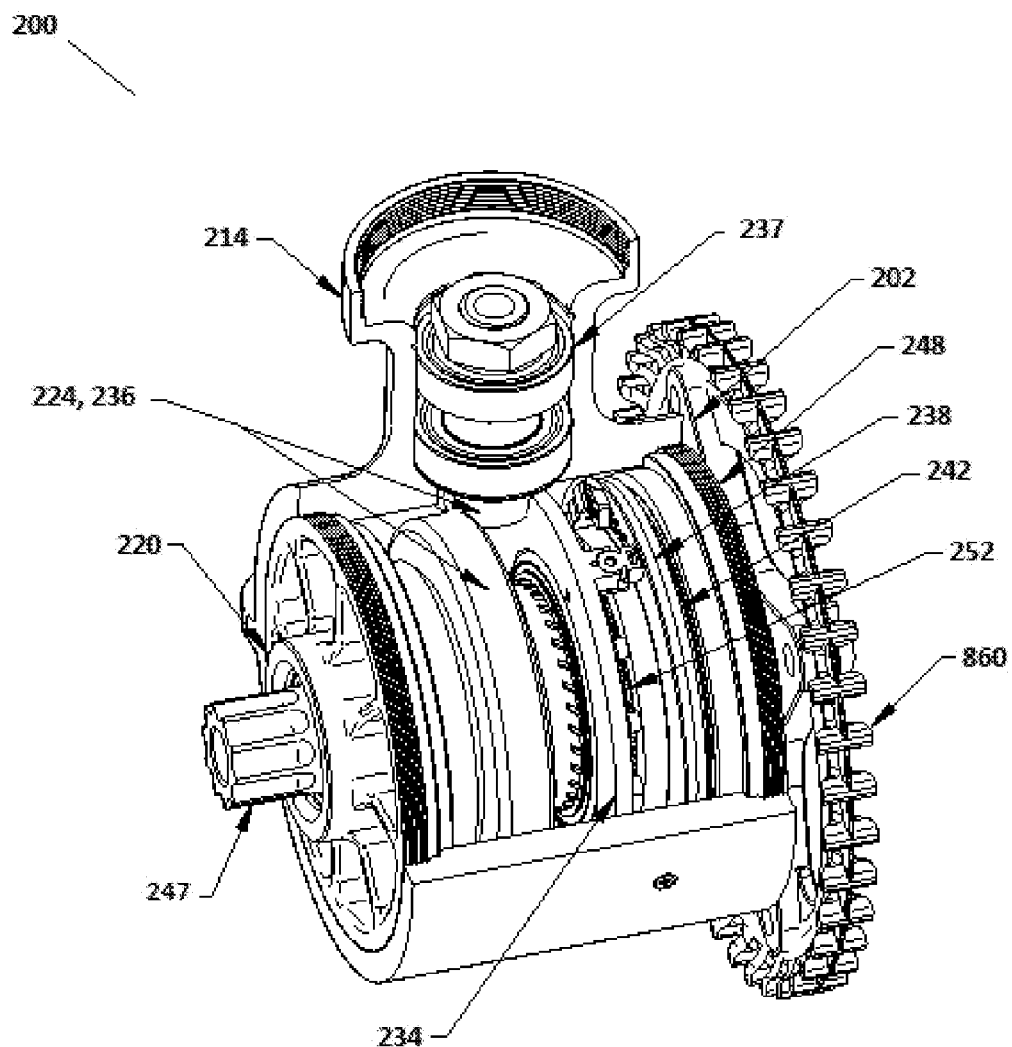
FIG. 10 is a perspective view of an example drive system according to various example embodiments, partially cut-away to illustrate various example components therein.

FIG. 9 is an exploded perspective view of example components of an example drive system 200 according to various example embodiments, and FIG. 10 is a perspective view of such an example drive system 200, partially cutaway to illustrate an example assembly of various example components therein. Such a drive system 200 may include any or all of a housing 210 including a motor mounting tower 214 portion and a lower portion 216, end cap assembly 220 for the non-drive side, washer 222, hypoid gear 224, such as a 45-tooth hypoid gear, sump plug 226, fasteners 228, pressure relief valve 230, washers 232, friction ring stop 234, pinion gear assembly 236 constructed to mesh with hypoid gear 224, hypoid and motor race bearing 237, torque sensor board 238, rubber O-ring 240, drive coupling with torque actuator assembly with torque indicator plate 242, output coupler 244, crank spindle 245, spindle-pawl-clutch assembly 246, crankshaft interface 247, end cap assembly 248 for the drive side, various fasteners 250, motor drive clutch 252, and an output spider 202 connected to a sprocket 860.

FIGS. 11, 12, 13A, 13B, 14A, and 14B illustrate example components of an example torque sensing system for use in the drive system 200 of an integrated unitary motor-controller-drive system 150, and how they may elegantly work together to accurately and precisely sense the amount of force being applied to the pedals by a rider pedaling the bicycle 1000, and to generate therefrom a signal that may be communicated to the controller 400 to control how much power is applied by the motor 300 to the drive system 200, according to various example embodiments. Torque sensing systems for modulating the power applied by the motor of an electric bicycle are known, such as that described in U.S. Pat. No. 6,196,347 B1 issued Mar. 6, 2001 to Chao et al. ("Chao"), which is hereby incorporated herein by reference. However, the present system is different from and an improvement over Chao in several important respects as will be appreciated by persons of skill in the art. Examples of the present torque sensing system may comprise a torque sensor board 238, such as that disclosed in the '356 Application, which is incorporated herein by reference, which may wirelessly measure changes in inductance created by very small relative axial movements between the sensor board 238 and a proximally-located component, such as the torque indicator plate 242 of the drive coupling with torque actuator assembly. Unlike Chao, the torque sensor board 238 may sense movements not just from a point, but from across most or all of the surface of the ring-shaped board 238, which provides a more robust measurement. Further, the present system may measure movement with changes in inductance that are processed and then communicated digitally to the controller 400 using CAN communications by components directly on the sensor board 238, instead of measuring and communicating raw analog voltage changes produced by a Hall Effect sensor as in Chao. Numerous mechanical differences between the present invention and Chao also exist and provide improvements to component stability, lower friction, and other aspects as will be apparent to persons of skill in the art.

Figure 11:
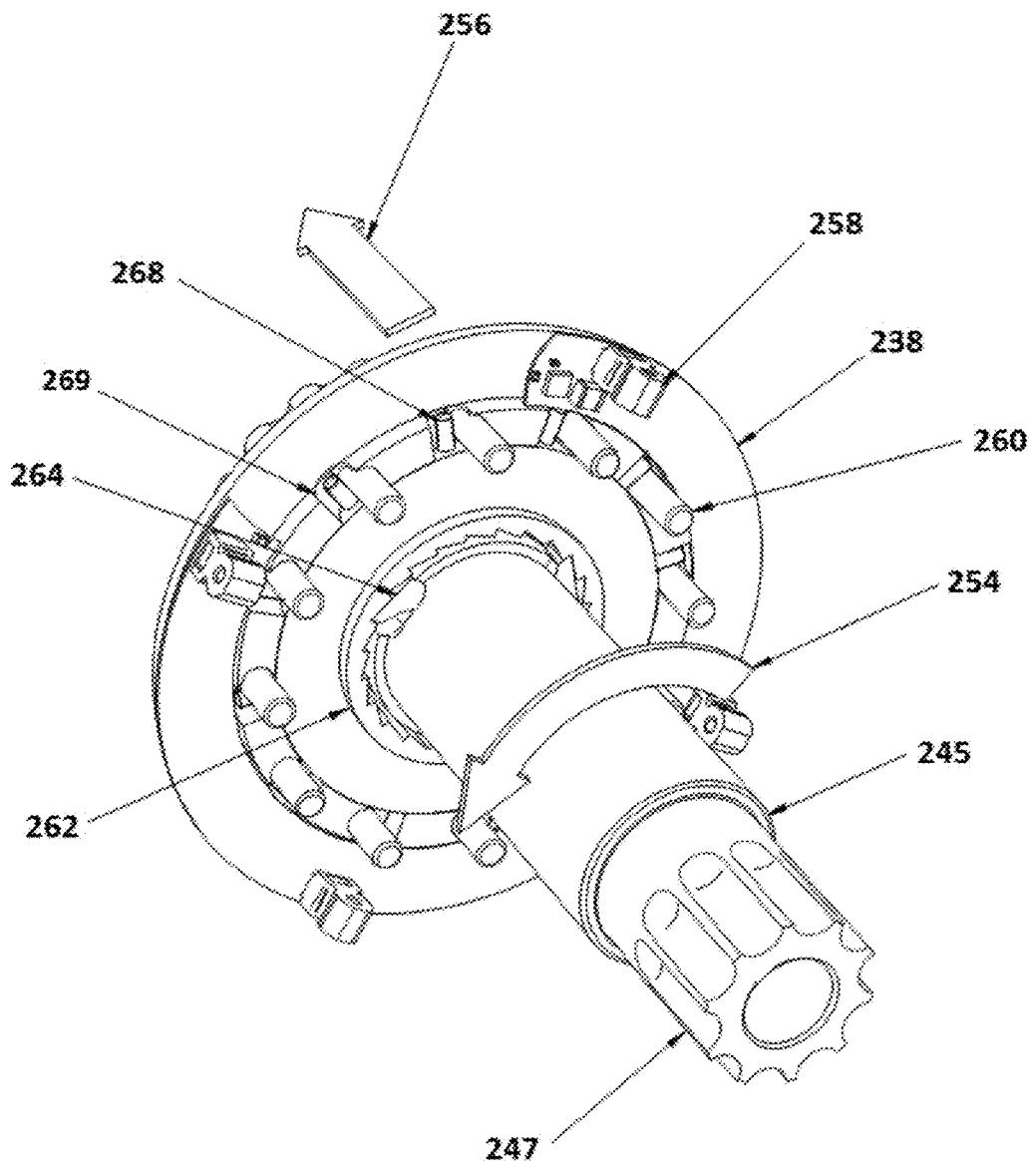
FIG. 11 is a perspective view of example components of an example torque sensing system for use in an integrated unitary motor-controller-drive system according to various example embodiments.
Figure 12:
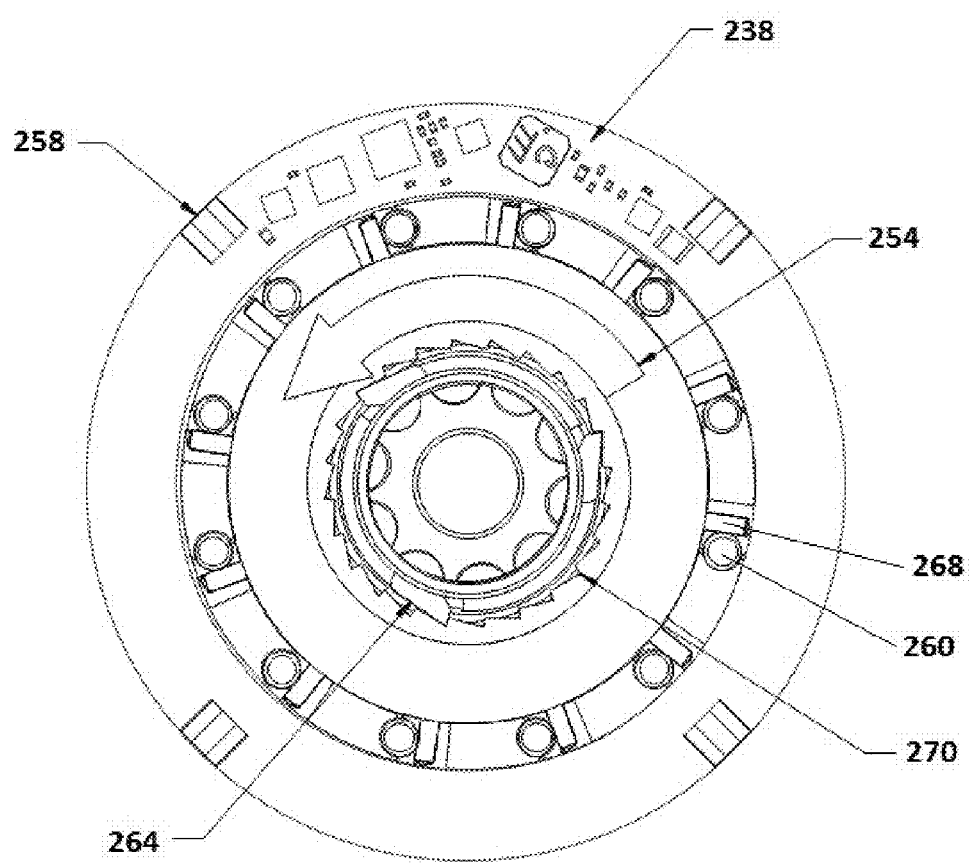
FIG. 12 is a left side elevation view of the example components of the example torque sensing system of FIG. 11.
Figure 13A:
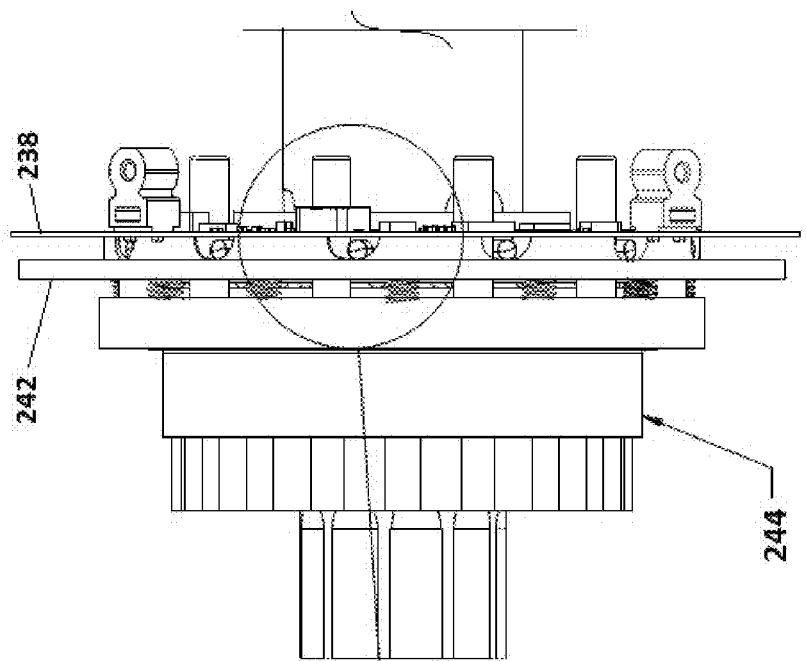
FIG. 13A is a front side elevation view of the example components of the example torque sensing system of FIG. 11, shown in a low or zero torque condition.
Figure 13B:
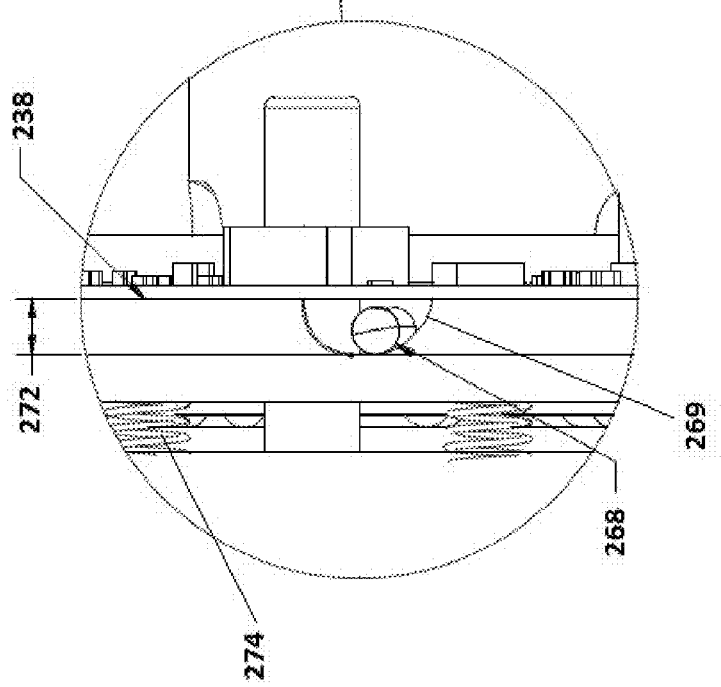
FIG. 13B is closer view of a portion of FIG. 13A.
Figure 14A:
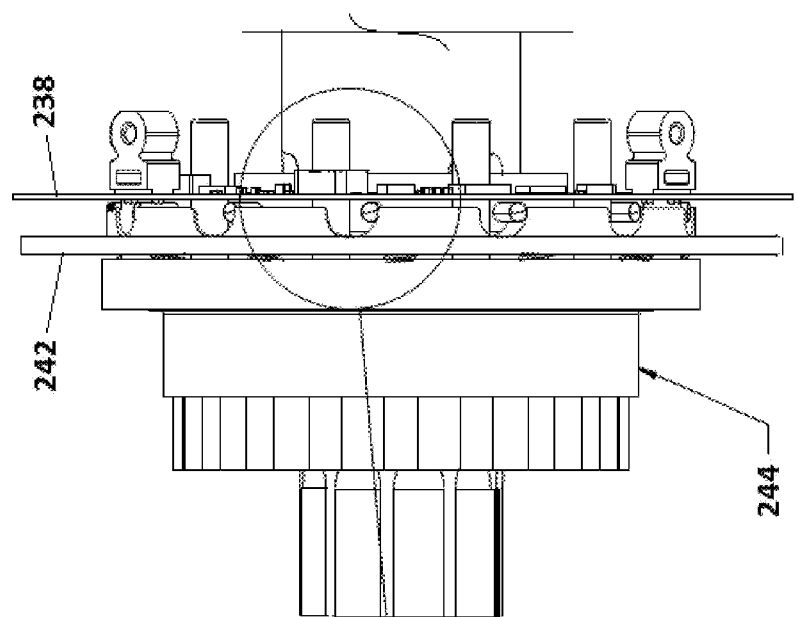
FIG. 14A is a front side elevation view of the example components of the example torque sensing system of FIG. 11, shown in a high torque condition.
Figure 14B:
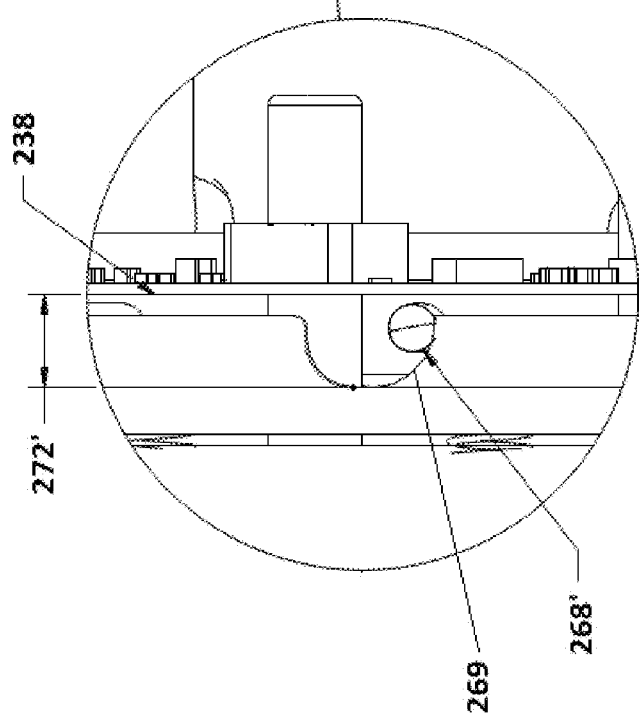
FIG. 14B is closer view of a portion of FIG. 14A.

With continuing reference to FIGS. 11-14B, torque sensor board 238 may include mounting posts 258 to mount the torque sensor board 238 to the motor drive clutch 252 as shown in FIG. 10. In addition to torque sensor board 238, example components of a torque sensing system for use in the drive system 200 may include a crank spindle 245 that is driven in the direction indicated by arrow 254 by rider-provided pedaling force via pedals (not shown) connected to cranks 850L, 850R (FIG. 6), which are connected to crankshaft interfaces 247 on crank spindle 245. The rider (not shown) is able to freewheel by pedaling in the backward rotational direction by the action of pivoting clutch pawls 264 biased toward and locking with a torque collar 262 of the ratcheting clutch 270 in the forward direction 254 but not in the opposite direction. When the rider increasingly applies torque in the forward direction 254 to the drive system 200 by pedaling the bicycle 1000 with more than a predetermined amount of force predetermined in part by the preload of springs 274, the torque indicator plate 242 of the drive coupling with torque actuator assembly rotates slightly in the forward direction 254 relative to the torque sensor board 238 and ramp pins 268 move along curved ramp or cam surfaces 269 between first low or no-torque positions shown in FIGS. 13A and 13B and second maximum torque positions 268' as shown in FIGS. 14A and 14B. Since surfaces 269 are curved, this movement of pins 268 along surfaces 269 causes the torque actuator assembly to compress springs 274 and move axially away from the torque sensor board 238 in direction 256 (FIG. 11) from an initial low or no-torque distance 272 up to a maximum second "high torque" distance 272', as shown in FIGS. 13B and 14B. The electronics on the torque sensor board 238 sense a change in inductance corresponding to the magnitude of the movement between 272 and 272' and convert that change inductance to a digital control signal that is communicated to controller 400 for controlling the output of the motor 300. Guide pins 260 may also be provided as shown in FIGS. 11 and 12 for instance to limit movement of the pins 268.

As illustrated and described herein and in the '356 Application that is incorporated herein by reference, in various example embodiments the drive system 200 may comprise two concentric "spindles." The inner spindle 245 functions in combination with crankshafts 850L and 850R as a traditional bicycle crankshaft, attached to the pedals (not shown) on either side of the bicycle 1000. The outer spider 202 or "outer spindle" is connected to the rear wheel 802 through a ring gear 860 and a chain, belt, shaft, or other transmission means 870. The rear wheel 802 may have a freewheel feature but it does not need one, because a freewheel or ratcheting feature is provided in the drive system 200 as disclosed herein. The outer spider 202 functions as the "e-assist," or the means by which the electric motor 300 and drive system 200 assists in driving the sprocket 860, transmission means 870, and rear wheel 802. The pinion gear assembly 236 may or may not feature a clutch or freewheel (not shown) to prevent the motor 300 from being overspun. The inner spindle 245 and outer spindle or spider 202 are coupled together with a freewheel ratchet clutch as described herein (FIG. 12), so that the outer spindle or spider 202 can rotate proportionally to the movement of the rear wheel 802, whereas the inner spindle 245 can optionally remain stationary, allowing the rider to coast without needing to pedal. This also allows the electric motor 300 to propel the bicycle 1000 independent of rider pedaling effort. In various example embodiments, modes of operation may include:

i. Rider pedaling, no e-assist. The pedals power the inner spindle 245, which connects to the outer spindle or spider 202 by catching the freewheel coupler 270. The outer spindle or spider 202 sends the power to the rear wheel 802 using the ring gear 860, chain, belt, shaft, or other transmission means 870.

ii. Rider pedaling, with e-assist. The electric motor 300 powers the outer spindle or spider 202 though the gearing 224, 236 (FIG. 10). The outer spindle or spider 202 sends the power to the rear wheel 802. The pedals power the inner spindle 245, and as long as the rider is pedaling faster than the contribution of the electric motor 300, the freewheel mechanism 270 catches and couples the inner spindle 245 with the outer spindle or spider 202, thereby adding the power of the rider and the motor 300 together.

iii. Rider coasting, with e-assist. The electric motor 300 powers the outer spindle or spider 202 through the gearing 224, 236. The outer spindle or spider 202 sends the power to the rear wheel 802. As long as the rider is pedaling slower than the speed of rotation of the outer spindle or spider 202 provided by the electric motor 300, the freewheel mechanism 270 will not catch, decoupling the inner spindle 245 from the outer spindle or spider 202.

iv. Rider coasting, with regenerative braking. As illustrated and described herein and in the '356 Application that is incorporated herein by reference, in various example embodiments a bicycle 1000 incorporating the system 100 may include regenerative braking to slow the bicycle 1000 by changing some of the kinetic energy of the moving bicycle 1000 into electrical energy to charge the batteries 500. In such embodiments, power is transmitted from the rear wheel 802 to the outer spindle or spider 202 to the electric motor 300 through the gearing 224, 236, therefore reducing the speed and kinetic energy of the bicycle 1000. The inner spindle 245 freewheels and is decoupled from the outer spindle or spider 202.

v. Operating pedaling, with regenerative braking. The electric motor 300 absorbs power from the outer spindle or spider 202 though the gearing 224, 236, as explained in the immediately preceding paragraph. If the rider is simultaneously applying sufficient torque by pedaling, the inner spindle 245 engages the freewheel mechanism 270 and is coupled with the outer spindle or spider 202, in which case the rider's legs provide regenerative energy to the batteries 500. Note that this mode of operation may not be possible where a clutch is provided on the motor 300 to prevent over-spinning the motor 300, or when the ratio of the gears 224, 236 is too high.

vi. Rider coasting, no e-assist or regenerative braking. The inner spindle 245 is decoupled from the outer spindle or spider 202 and freewheels. The electric motor 300 neither absorbs nor delivers power to the outer spindle or spider 202.

Any of the suitable technologies and materials set forth and incorporated herein may be used to implement various example aspects of the invention as would be apparent to one of skill in the art. Although exemplary embodiments and applications of the invention have been described herein including as described above and shown in the included example Figure(s), there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. An integrated electric bicycle drive system comprising:
an integrated unitary motor-controller-drive system for a bicycle having a frame, the integrated unitary motor-controller-drive system for a bicycle having a frame comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket configured to be mechanically coupled with a rear wheel of the bicycle and to receive additional power from a rider of the bicycle pedaling the bicycle; wherein the electric motor and the controller portions of the integrated unitary motor-controller-drive system are configured to slide into and be housed within a first tube portion of the frame through an open bottom portion of the frame, the drive system portion of the integrated unitary motor-controller-drive system configured to attach with and cover the open bottom portion of the frame when the electric motor and the controller portions of the integrated unitary motor-controller-drive system are housed within the first tube portion of the frame;
a longitudinally-extending battery pack configured to be electrically connected with and to provide electrical power to the electric motor and the controller, the longitudinally-extending battery pack configured to slide into and be housed within a second tube portion of the frame, and
the first tube portion of the frame comprises a seat post tube configured to partially receive therein a post to support a seat for the bicycle.

2. The integrated electric bicycle drive system of claim 1, wherein the first tube portion of the frame comprises a front down tube that extends from a head tube of the frame to a bottom bracket shell of the frame.

3. The integrated electric bicycle drive system of claim 1, wherein the second tube portion of the frame is a hollow cylinder having a round outer diameter and a round inner diameter comprising a seat post tube configured to partially receive therein a post to support a seat for the bicycle.

4. The integrated electric bicycle drive system of claim 1, wherein the longitudinally-extending battery pack has an electrical energy capacity of at least 800 Watt-hours.

5. The integrated electric bicycle drive system of claim 4, wherein the motor is capable of producing at least 750 Watts of power.

6. The integrated electric bicycle drive system of claim 5, wherein the motor is capable of producing at least 100 Newton-meters of torque.

7. The integrated electric bicycle drive system of claim 6, wherein the unitary motor-controller-drive system and the longitudinally-extending battery pack together weigh 16 pounds or less.

8. The integrated electric bicycle drive system of claim 1, wherein the open bottom portion of the frame comprises a bottom bracket shell with an open bottom portion.

9. A bicycle having a frame, the bicycle comprising:
an integrated unitary motor-controller-drive system comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket mechanically coupled with a rear wheel of the bicycle and configured to receive additional power from a rider of the bicycle pedaling the bicycle; wherein the electric motor and the controller portions of the integrated unitary motor-controller-drive system are housed within a first tube portion of the frame, and the drive system portion of the integrated unitary motor-controller-drive system is removably attached to an open bottom portion of the frame, the integrated unitary motor-controller-drive system configured to be removable from the frame and replaceable in the frame in one piece; and
a longitudinally-extending battery pack electrically connected with and configured to provide electrical power to the electric motor and the controller, the longitudinally-extending battery pack removably housed within a second tube portion of the frame; and
the first tube portion of the frame comprises a seat post tube configured to partially receive therein a post to support a seat for the bicycle.

10. The bicycle of claim 9, wherein the first tube portion of the frame comprises a front down tube that extends from a head tube of the frame to a bottom bracket shell portion of the frame.

11. The bicycle of claim 9, wherein the second tube portion of the frame is a hollow cylinder having a round outer diameter and a round inner diameter comprising a seat post tube configured to partially receive therein a post to support a seat for the bicycle.

12. The bicycle of claim 9, wherein the longitudinally-extending battery pack has an electrical energy capacity of at least 800 Watt-hours.

13. The bicycle of claim 12, wherein the motor is capable of producing at least 750 Watts of power.

14. The bicycle of claim 13, wherein the motor is capable of producing at least 100 Newton-meters of torque.

15. The bicycle of claim 14, wherein the unitary motor-controller-drive system and the longitudinally-extending battery pack together weigh 16 pounds or less.

16. The bicycle of claim 14, wherein the electric motor and the controller portions of the integrated unitary motor-controller-drive system extend along a longitudinal axis and have cross-sectional areas perpendicular to their longitudinal axis, and the cross-sectional areas are no larger than 4.9 square inches.

17. The bicycle of claim 14, wherein the longitudinally-extending battery pack extends along a longitudinal axis and has a cross-sectional area perpendicular to its longitudinal axis, and the cross-sectional area is no larger than 24.9 square inches.

18. The bicycle of claim 14, wherein the first tube portion of the frame is hollow and has an interior that extends along a longitudinal axis and that has a cross-sectional area perpendicular to its longitudinal axis, and the cross-sectional area is no larger than 5 square inches.

19. The bicycle of claim 14, wherein the second tube portion of the frame is hollow and has an interior that extends along a longitudinal axis and that has a cross-sectional area perpendicular to its longitudinal axis, and the cross-sectional area is no larger than 25 square inches.

20. The bicycle of claim 9, wherein the open bottom portion of the frame comprises a bottom bracket shell with an open bottom portion.

21. An integrated electric bicycle drive system comprising:
an integrated unitary motor-controller-drive system for a bicycle having a frame, the integrated unitary motor-controller-drive system for a bicycle having a frame comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket configured to be mechanically coupled with a rear wheel of the bicycle and to receive additional power from a rider of the bicycle pedaling the bicycle; wherein the electric motor and the controller portions of the integrated unitary motor-controller-drive system are configured to slide into and be housed within a first tube portion of the frame through an open bottom portion of the frame, the drive system portion of the integrated unitary motor-controller-drive system configured to attach with and cover the open bottom portion of the frame when the electric motor and the controller portions of the integrated unitary motor-controller-drive system are housed within the first tube portion of the frame;
a longitudinally-extending battery pack configured to be electrically connected with and to provide electrical power to the electric motor and the controller, the longitudinally-extending battery pack configured to slide into and be housed within a second tube portion of the frame; and
the second tube portion of the frame comprises a front down tube that extends from a head tube of the frame to a bottom bracket shell of the frame.

22. A bicycle having a frame, the bicycle comprising:
an integrated unitary motor-controller-drive system comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket mechanically coupled with a rear wheel of the bicycle and configured to receive additional power from a rider of the bicycle pedaling the bicycle; wherein the electric motor and the controller portions of the integrated unitary motor-controller-drive system are housed within a first tube portion of the frame, and the drive system portion of the integrated unitary motor-controller-drive system is removably attached to an open bottom portion of the frame, the integrated unitary motor-controller-drive system configured to be removable from the frame and replaceable in the frame in one piece; and
a longitudinally-extending battery pack electrically connected with and configured to provide electrical power to the electric motor and the controller, the longitudinally-extending battery pack removably housed within a second tube portion of the frame; and
the second tube portion of the frame comprises a front down tube that extends from a head tube of the frame to a bottom bracket shell of the frame.

23. A bicycle having a frame, the bicycle comprising:
an integrated unitary motor-controller-drive system comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket mechanically coupled with a rear wheel of the bicycle and configured to receive additional power from a rider of the bicycle pedaling the bicycle; wherein the electric motor and the controller portions of the integrated unitary motor-controller-drive system are housed within a first tube portion of the frame, and the drive system portion of the integrated unitary motor-controller-drive system is removably attached to an open bottom portion of the frame, the integrated unitary motor-controller-drive system configured to be removable from the frame and replaceable in the frame in one piece; and
a longitudinally-extending battery pack electrically connected with and configured to provide electrical power to the electric motor and the controller, the longitudinally-extending battery pack removably housed within a second tube portion of the frame; and
the longitudinally-extending battery pack is configured to be removable from the frame by removing the integrated unitary motor-controller-drive system from the frame and sliding the longitudinally-extending battery pack out of the second tube portion of the frame, through the open bottom portion of the frame.

24. A bicycle having a frame, the bicycle comprising:

an integrated unitary motor-controller-drive system comprising: an electric motor; a controller configured to electronically control the electric motor; and a drive system mechanically coupled with the electric motor and configured to receive from the electric motor rotational power about a first axis and to transmit said rotational power to a sprocket rotatable about a second axis perpendicular to the first axis, the sprocket mechanically coupled with a rear wheel of the bicycle and configured to receive additional power from a rider of the bicycle pedaling the bicycle; wherein the electric motor and the controller portions of the integrated unitary motor-controller-drive system are housed within a first tube portion of the frame, and the drive system portion of the integrated unitary motor-controller-drive system is removably attached to an open bottom portion of the frame, the integrated unitary motor-controller-drive system configured to be removable from the frame and replaceable in the frame in one piece; and a longitudinally-extending battery pack electrically connected with and configured to provide electrical power to the electric motor and the controller, the longitudinally-extending battery pack removably housed within a second tube portion of the frame;

the integrated unitary motor-controller-drive system is configured to be removable from the frame by detaching the integrated unitary motor-controller-drive system from the open bottom portion of the frame, and sliding the electric motor and the controller portions of the integrated unitary motor-controller-drive system out of the first tube portion of the frame, through the open bottom portion of the frame; and the longitudinally-extending battery pack is configured to be removable from the frame by removing the integrated unitary motor-controller-drive system from the frame and sliding the longitudinally-extending battery pack out of the second tube portion of the frame, through the open bottom portion of the frame.

\* \* \* \* \*